(12) United States Patent
Felt

(10) Patent No.: US 9,398,782 B2
(45) Date of Patent: Jul. 26, 2016

(54) AERODYNAMIC BICYCLE HELMET

(75) Inventor: James Michael Felt, Auburn, CA (US)

(73) Assignee: Felt Racing, LLC, Irvine, CA (US)

(*) Notice: Subject to any disclaimer, the term of this patent is extended or adjusted under 35 U.S.C. 154(b) by 1270 days.

(21) Appl. No.: 12/766,212

(22) Filed: Apr. 23, 2010

(65) Prior Publication Data

US 2011/0258757 A1 Oct. 27, 2011

(51) Int. Cl.
*A42B 7/00* (2006.01)
*A42B 3/04* (2006.01)
*B62J 29/00* (2006.01)
*B62K 21/12* (2006.01)
*B62J 99/00* (2009.01)

(52) U.S. Cl.
CPC .............. *A42B 3/0493* (2013.01); *B62J 29/00* (2013.01); *B62K 21/125* (2013.01); *B62J 2099/0026* (2013.01); *B62J 2099/0033* (2013.01)

(58) Field of Classification Search
CPC .................................................... A42B 3/0493
USPC ................. 2/10, 421, 422, 425; 359/842, 855
See application file for complete search history.

(56) References Cited

U.S. PATENT DOCUMENTS

| | | | |
|---|---|---|---|
| 2,445,203 A * | 7/1948 | Bowers ................................ 2/10 |
| 3,091,958 A * | 6/1963 | Robins ........................... 73/45.2 |
| 3,804,495 A | 4/1974 | Rayow et al. |
| 4,229,836 A | 10/1980 | Stinger |
| 4,375,316 A * | 3/1983 | Le Vantine .................... 359/842 |
| 4,380,369 A * | 4/1983 | Schacht ......................... 359/842 |
| 4,564,959 A | 1/1986 | Zahn |
| 4,581,776 A | 4/1986 | Kie |
| 4,647,165 A | 3/1987 | Lewis |
| 4,653,123 A * | 3/1987 | Broersma ......................... 2/425 |
| 4,679,916 A * | 7/1987 | Roller et al. ................... 359/862 |
| D293,496 S * | 12/1987 | Gentes .......................... D29/106 |
| 4,826,306 A * | 5/1989 | Grissen et al. ................ 359/842 |
| 4,903,350 A * | 2/1990 | Gentes et al. ...................... 2/421 |
| 4,995,117 A | 2/1991 | Mirage |
| D316,165 S * | 4/1991 | Gentes et al. ................ D29/102 |
| 5,088,130 A | 2/1992 | Chiarella |
| 5,138,901 A | 8/1992 | Dabandjian et al. |
| 5,148,327 A * | 9/1992 | Gaxiola, Jr. .................... 359/855 |
| 5,173,970 A | 12/1992 | Shifrin |
| 5,243,417 A * | 9/1993 | Pollard ........................... 348/118 |
| 5,305,153 A * | 4/1994 | Kochocki ....................... 359/842 |
| 5,324,059 A * | 6/1994 | Bryne ............................ 280/283 |
| 5,337,421 A * | 8/1994 | Jeng ................................. 2/425 |
| 5,467,906 A * | 11/1995 | Forman ......................... 224/426 |

(Continued)

FOREIGN PATENT DOCUMENTS

| | | |
|---|---|---|
| CN | 2152416 Y | 1/1994 |
| DE | 3144872 | 9/1983 |

(Continued)

*Primary Examiner* — Richale Quinn
(74) *Attorney, Agent, or Firm* — Stetina Brunda Garred & Brucker

(57) ABSTRACT

An aerodynamic bicycle helmet for decreasing coefficient of drag when a head of a rider is in a down position is disclosed. The helmet may comprise a cushion with a concave cavity for receiving the head of the rider; a strap attached to the cushion for maintaining the cushion on the head of rider in the event of a crash; an exterior shell disposed over the cushion, the exterior shell having a leading portion with a spherical or a parabolic configuration, the leading portion positioned on a top portion of the head of the rider when the helmet is worn by the rider.

11 Claims, 5 Drawing Sheets

(56) References Cited

U.S. PATENT DOCUMENTS

| | | | |
|---|---|---|---|
| 5,590,209 | A | 12/1996 | Pratt et al. |
| 5,659,900 | A | 8/1997 | Arney et al. |
| 5,675,843 | A * | 10/1997 | Grim et al. ........................ 2/422 |
| 5,760,865 | A * | 6/1998 | Webster ........................... 351/41 |
| 5,794,272 | A * | 8/1998 | Workman et al. ................. 2/421 |
| 5,855,388 | A * | 1/1999 | Brewer ....................... 280/288.4 |
| 6,293,449 | B1 * | 9/2001 | McGuire et al. ............. 224/420 |
| 6,557,437 | B2 * | 5/2003 | Masui et al. .................. 74/551.8 |
| 6,615,648 | B1 | 9/2003 | Ferguson et al. |
| 6,634,758 | B2 * | 10/2003 | Preis et al. ................... 359/842 |
| 6,729,778 | B1 * | 5/2004 | Wu et al. ....................... 396/428 |
| 6,795,977 | B2 | 9/2004 | Basson et al. |
| 7,127,965 | B2 * | 10/2006 | Chuang ........................ 74/551.8 |
| 7,535,086 | B2 | 5/2009 | Merilo et al. |
| 7,833,135 | B2 * | 11/2010 | Radow et al. .................. 482/57 |
| 2001/0039850 | A1 | 11/2001 | Masui et al. |
| 2004/0117896 | A1 | 6/2004 | Madey et al. |
| 2004/0143879 | A1 | 7/2004 | Robertson |
| 2006/0026741 | A1 | 2/2006 | Lang-Ree et al. |
| 2006/0232389 | A1 | 10/2006 | Chu |
| 2007/0179632 | A1 * | 8/2007 | Campagnolo et al. ............ 700/2 |
| 2010/0171832 | A1 * | 7/2010 | Solida ........................... 348/148 |

FOREIGN PATENT DOCUMENTS

| | | |
|---|---|---|
| DE | 229510 A1 | 11/1985 |
| DE | 10212516 A1 | 10/2003 |
| DE | 202004010481 | 12/2004 |
| DE | 202006010501 U1 | 8/2006 |
| EP | 0650673 | 3/1995 |
| EP | 1635996 A1 | 2/2006 |
| JP | 2003113522 A | 4/2003 |
| JP | 2006/103600 | 4/2006 |
| WO | 9940477 A1 | 8/1999 |
| WO | 2010048133 A1 | 4/2010 |

* cited by examiner

AERODYNAMIC BICYCLE HELMET

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a helmet for a bicycle.

Helmets are worn by bicycle riders to protect the rider's head in the event of a crash. The helmet absorbs the shock of the crash instead of the rider's head. Road bicycles at competition levels exceed speeds of 25 miles per hour. If a rim breaks, or cars and other cyclists crash into the bicycle rider, the bicycle rider may fall to the ground in a violent and uncontrolled motion. The helmet protects the rider's head from unintended contact with the pavement, other cyclists, automobiles, etc. The helmet absorbs the shock impact instead of the rider's head.

FIGS. 1 and 2 illustrate prior art bicycle helmets. FIG. 1 illustrates a typical road bicycle helmet for recreational use. The helmet incorporates holes to provide air flow through the helmet so that the rider's head does not overheat during the bike ride. Unfortunately, due to the discontinuities formed by the apertures in the helmet as well as the rider's facial features, there is an increased coefficient of drag. Additionally, the back side of the helmet produces an area of low pressure which provides an overall rearward pressure differential to the rider's head. Although these sources of drag may be characterized in recreational riding as minute, by competition level standards, all minute sources of friction and drag may be considered to be significant.

Referring to FIG. 2, a different type of bicycle helmet is shown. The bicycle helmet does not incorporate apertures for providing air flow through the helmet to cool down the rider's head during a bike ride. The helmet places aerodynamics over comfort. Additionally, the rider's face is pointed forward and exposed to the oncoming wind so that the rider's eyes may survey the upcoming terrain and avoid any obstacles in front of him/her without crashing. In this position, the tail portion is blended to the rider's back. Unfortunately, the bicycle rider must still look upwards so that the rider's face is in the direction of wind flow. The rider's face increases the coefficient of drag while the rider is looking forward. Also, the rider's neck will be strained for having to look up all the time. Additionally, when the rider looks downward, the tail portion is raised upward as shown by the hidden lines. The back side of the tail portion experiences low pressure which provides a net backward force on the tail portion thereby slowing the rider down.

In both prior art FIGS. 1 and 2, the rider's head is cocked upward. During long rides, the rider must maintain this head up position so that the rider can keep track of obstacles in front of his/her path. Unfortunately, this is not a comfortable position. This up position creates neck strain thereby causing discomfort and potential long term physical problems to the rider.

Accordingly, there is a need in the art for an improved bicycle helmet.

BRIEF SUMMARY

The helmet discussed herein addresses the problems identified above, identified below and those that are known in the art.

The helmet may define a leading portion located generally at the top of the rider's head when the helmet is worn by the rider. The leading portion may have a spherical or parabolic configuration so that when the rider is in the aggressive stance or posture and the rider's head is in the down position, the leading portion of the helmet initially contacts the oncoming wind and splits the wind above and below as well as from side-to-side around the helmet. Preferably, the wind flows in a laminar flow over the helmet so as to reduce the coefficient of drag. The helmet may further have a tail portion which extends from the back rear of the helmet and is blended to the back surface of the rider's back. Alternatively, the helmet may have a trailing surface which follows a contour of the rider's head.

More particularly, an aerodynamic bicycle helmet for decreasing coefficient of drag when a head of a rider is in a down position is disclosed. The helmet may comprise a cushion, a strap and an exterior shell. The cushion may have a concave cavity for receiving the head of the rider. The strap may be attached to the cushion for maintaining the cushion on the head of rider in the event of a crash. The exterior shell may be disposed over the cushion. The exterior shell may have a leading portion with a parabolic configuration. The parabolic leading portion may be positioned on a top portion of the head of the rider when the helmet is worn by the rider.

The helmet may further have an eye shield attached to the exterior shell for blocking wind to the eyes of the rider. The exterior shell may be continuous and smooth so that the exterior shell does not incorporate cooling vents. The parabolic leading portion may be symmetrical about a medial axis which is generally aligned to a spine of the rider when the helmet is worn by the rider. The external shell may have a tail portion aerodynamically blended to a back surface of the rider. Alternatively, the external shell may have a trailing surface which follows a contour of the rider's head.

In an alternate embodiment, an aerodynamic bicycle helmet for decreasing coefficient of drag when a head of a rider is in a down position is disclosed. The helmet may comprise a cushion, a strap and an exterior shell. The cushion may have a concave cavity for receiving the head of the rider. The strap may be attached to the cushion for maintaining the cushion on the head of rider in the event of a crash. The exterior shell may be disposed over the cushion. The exterior shell may have a leading portion with a spherical configuration. The spherical leading portion may be positioned on a top portion of the head of the rider when the helmet is worn by the rider.

The helmet may further have an eye shield attached to the exterior shell for blocking wind to the eyes of the rider. The exterior shell of the helmet may be continuous and smooth without any cooling vents. The spherical leading portion may be symmetrical about a medial axis which is generally aligned to a spine of the rider when the helmet is worn by the rider. The external shell may have a tail portion aerodynamically blended to a back surface of the rider. Alternatively, the external shell may have a trailing surface which follows a contour of the rider's head.

A bicycle riding system is also disclosed. The system may comprise an aerodynamic helmet and a video system.

The aerodynamic bicycle helmet may decrease coefficient of drag when a head of a rider is in a down position. In particular, the helmet may comprise a cushion, a strap and an exterior shell. The cushion may have a concave cavity for receiving the head of the rider. The strap may be attached to the cushion for maintaining the cushion on the head of rider in the event of a crash. The exterior shell may be disposed over the cushion. The exterior shell may have a leading portion with a spherical or a parabolic configuration. The leading portion may be positioned on a top portion of the head of the rider when the helmet is worn by the rider.

The bicycle may comprise a front wheel, a rear wheel, a frame with the front and rear wheels attached to the frame, a handlebar attached to the front wheel and the frame for steering the front wheel, and a video system with a camera positioned to provide a front view of the bicycle path and a video screen to provide the front view of the bicycle path. The video screen may be mounted to the handlebar so that the rider can view the video screen while the rider maintains his/her head in the down position.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 7:
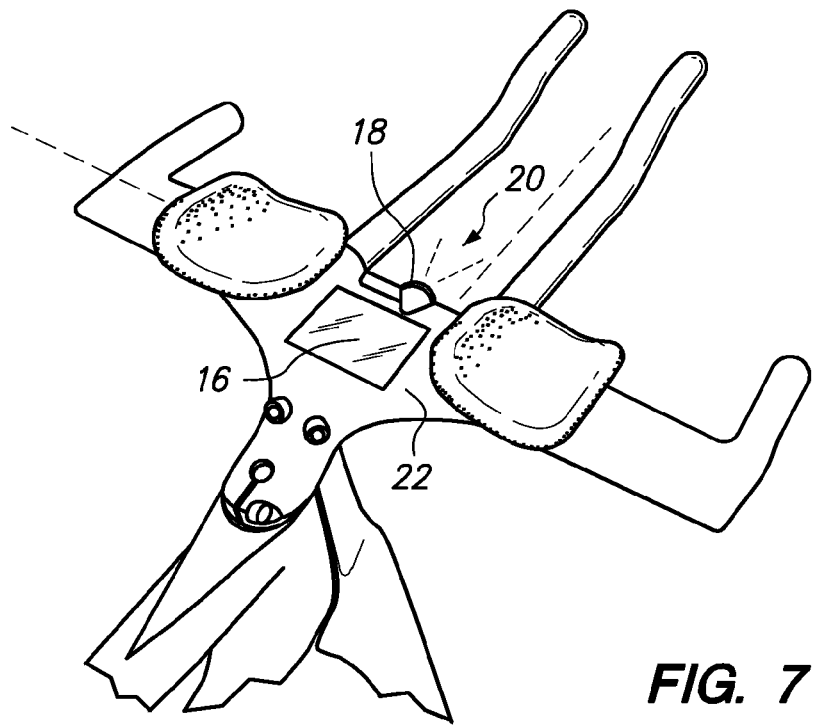
FIG. 7 is a perspective view of a first embodiment of a bicycle handlebar video system.
Figure 8:
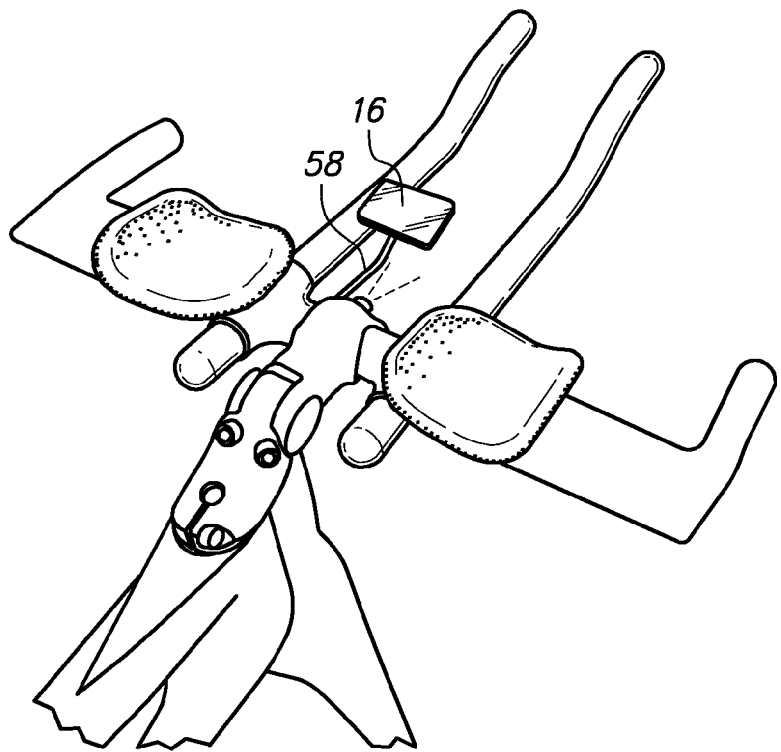
FIG. 8 is a second embodiment of the bicycle handlebar video system.
Figure 9:
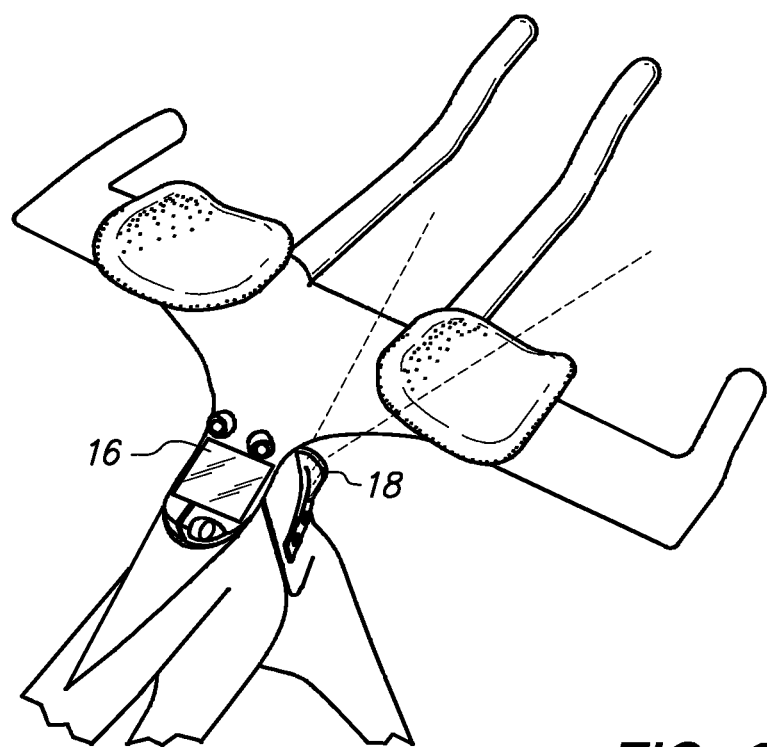
FIG. 9 is a third embodiment of the bicycle handlebar video system.

Referring now to the drawings, improved bicycle helmets 10, 12 are shown in FIGS. 3-6. When the rider's head is in the downward position, the exterior shell 14 forms an aerodynamic leading portion (i.e., parabolic configuration or spherical configuration) to split the air flow 15 around the helmet 10, 12 in a laminar fashion thereby reducing the coefficient of drag caused by the helmet 10, 12 and rider's head. The rider can maintain his/her head in the downward position by installing a bicycle handlebar video system 20 as described in U.S. patent application Ser. No. 12/257,124, filed on Oct. 23, 2008, the entire contents of which is expressly incorporated herein by reference. In this manner, the rider does not have to intermittently look up to view obstacles in front of the rider's bicycle path. Rather, the rider may look down at a screen 16 that displays a frontal view of the rider's bicycle path, as shown in FIGS. 7-9. In particular, a camera 18 may be pointed forward and feed images to the screen 16. The rider may look down at the screen 16 to obtain a picture of the bicycle's forward path so that the rider can make adjustments to the path as necessary to avoid obstacles. Accordingly, the improved bicycle helmets 10, 12 along with the bicycle handlebar video system 20 allows the rider to maintain a comfortable head down position and gain the benefit of an aerodynamic shaped helmet 10, 12.

Figure 1:
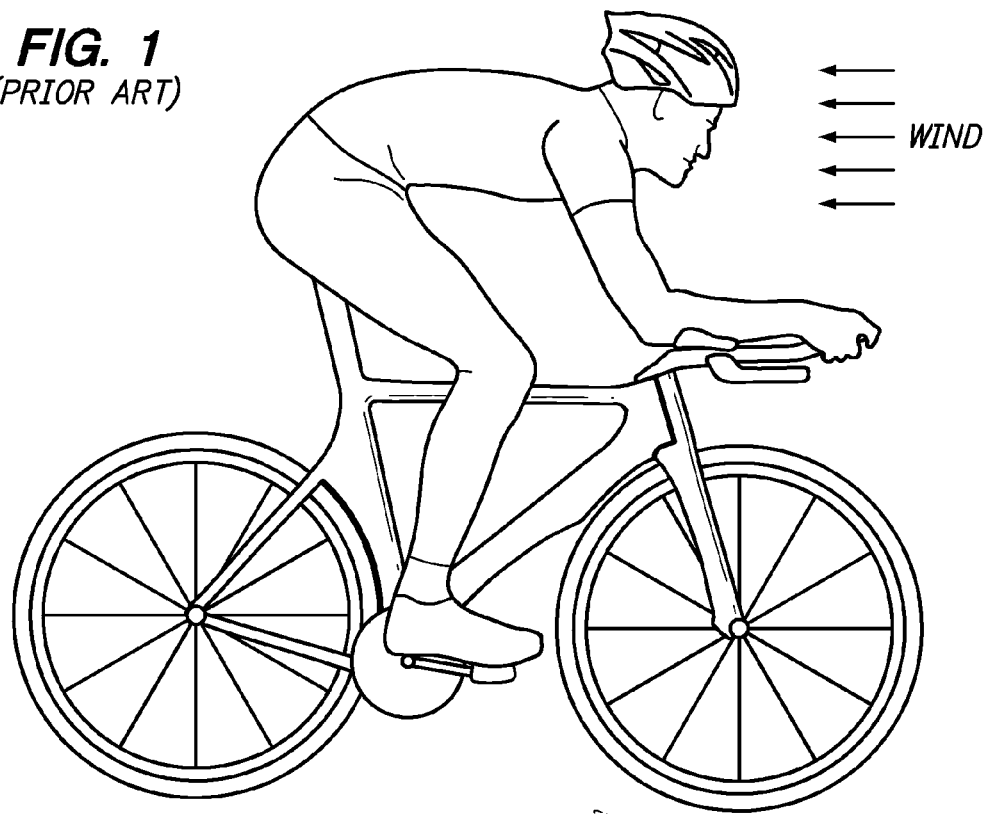
FIG. 1 is an illustration of a prior art road bicycle helmet.
Figure 2:
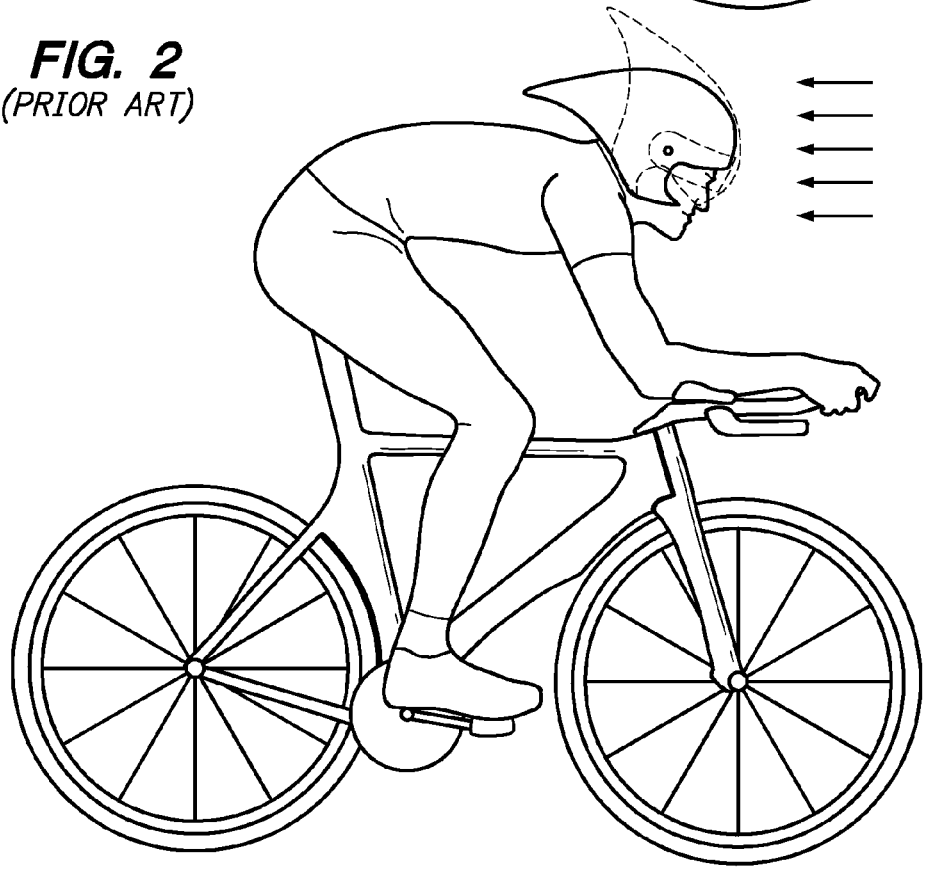
FIG. 2 is an illustration of another embodiment of a prior art road bicycle helmet.
Figure 3:
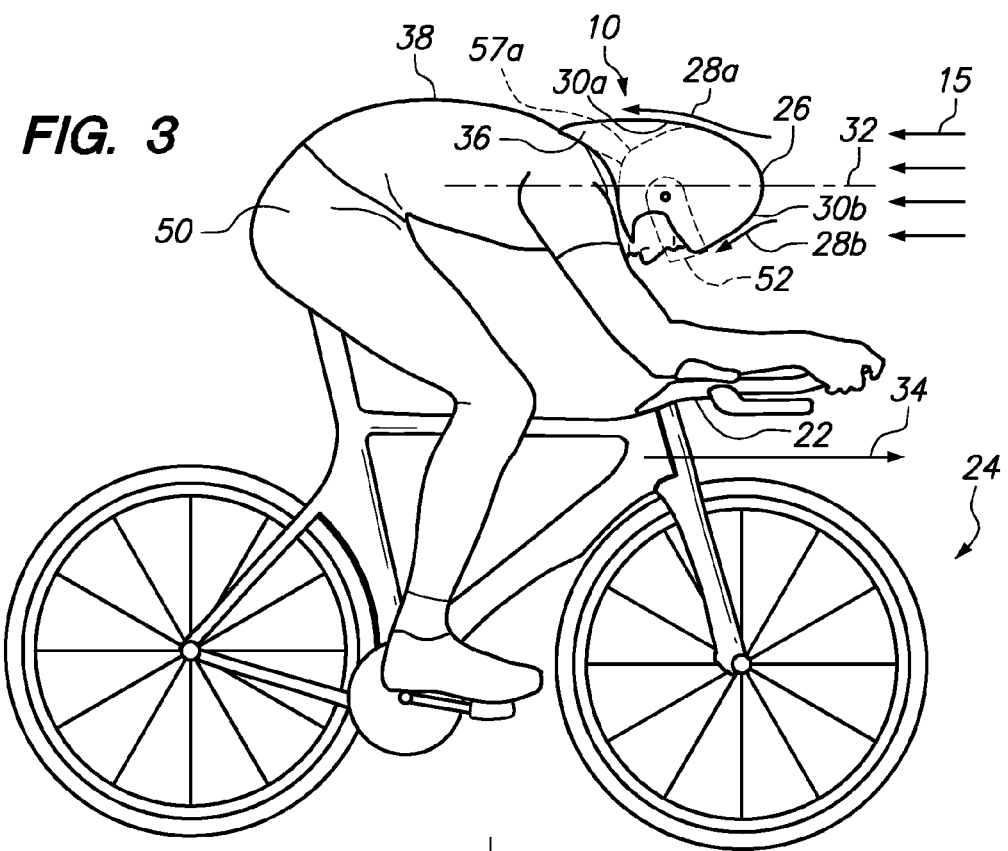
FIG. 3 is a side view of a parabolic shaped helmet.
Figure 4:
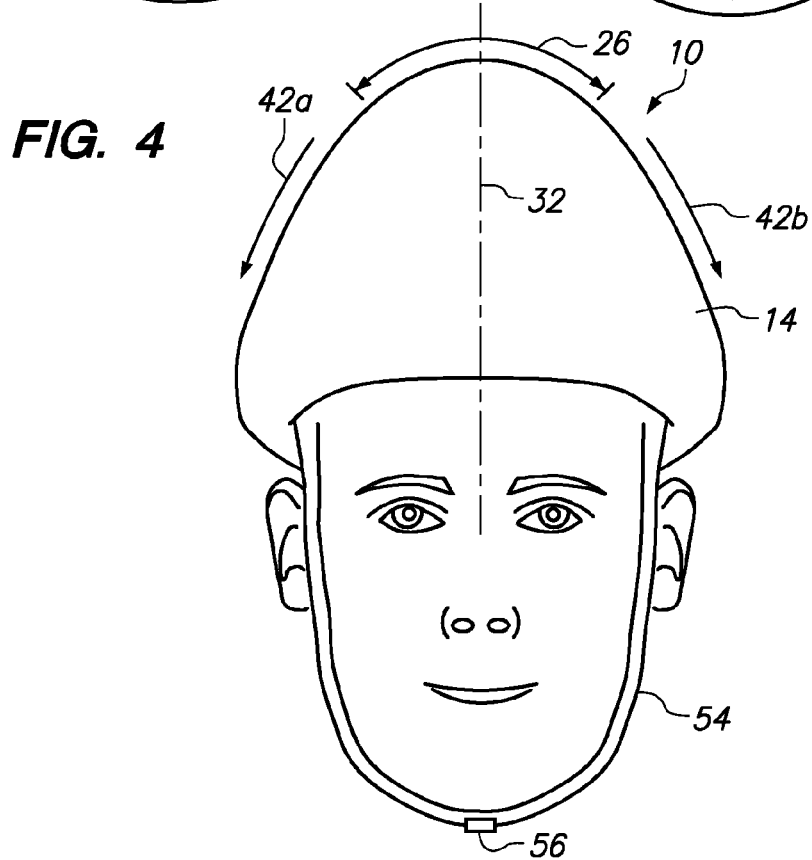
FIG. 4 is a front view of the helmet shown in FIG. 3.

Referring now to FIGS. 3 and 4, a first embodiment of the helmet 10 is shown. The helmet 10 incorporates a parabolic leading portion 26. When the rider is riding the bicycle 24 and the rider's head is in the downward position, the parabolic leading portion 26 initially contacts the oncoming wind 15 and splits the wind flow around the helmet 10 as shown by arrows 28a, b above and below the helmet 10. When the rider's head is in the downward position, as shown in FIG. 3, the upper and lower profiles 30a, b of the helmet 10 are generally symmetrical about axis 32 which may be generally parallel to a forward direction 34 of the bicycle 24. Also, a tail portion 36 of the upper profile 30a may generally blend with a back surface 38 of the rider 40. A low pressure is not created behind the rider's helmet 10 when the rider's head is in the downward position. The air 15 flows over the upper profile 30a and the back surface 38 of the rider 40. The rider does not have to lift up his/her head to look forward since the rider can view the video screen 16 of the bicycle handlebar video system 20 mounted to a handlebar 22, as shown in FIGS. 7-9.

More particularly, referring back to FIG. 3, during a road race, the rider 50 may be in an aggressive riding posture. In particular, the back of the rider is hunched forward in its lowermost position so that the collective frontal profile of the rider 50 and bicycle 24 is minimized to reduce the coefficient of drag. The rider's head is in the down position so that the neck of the rider is generally straight with the spine of the rider. This allows the rider to reduce or eliminate any neck pain that might be caused by looking up to view the terrain in front of the rider's path. The rider 50 can view the forward view by way of the bicycle handlebar video system 20 which is discussed herein. In this aggressive riding posture, the rider has a minimal frontal profile to reduce the coefficient of drag. Additionally, the helmet 10 of the rider 50 is shaped to further reduce the coefficient of drag. In particular, when the rider 50 is in the aggressive posture with his/her head in the down position as shown in FIG. 3, the helmet 10 may have a leading portion 26 that has a parabolic configuration. The parabolic configuration of the leading portion 26 of the helmet 10 allows the oncoming wind 15 to separate laminarly or less turbulently over the helmet 10 thereby further reducing the coefficient of drag. It is contemplated that the leading portion 26 of the helmet 10 is generally located at the top of the rider's head so that the parabolic leading portion 26 of the helmet 10 initially contacts the oncoming wind 15.

As the wind 15 proceeds backward, the wind 15 is split above and below the helmet 10 as shown by arrow 28a, b. Preferably, the wind 15 maintains laminar flow over the helmet 10. The air flow shown by directional arrow 28a flows over the tail portion 36 of the helmet 10 and over the back surface 38 of the rider 50. Preferably, the tail portion 36 is blended with the back surface 38 of the rider 50 so that the wind 15 maintains laminar flow over the transition between the tail portion 36 of the helmet 10 and the back surface 38 of the rider 50. For the wind 15 that flows below the helmet 10 shown by directional arrow 28b, the air flows over the transparent face mask 52 that is attached to the helmet 10.

Referring now to FIG. 4, a front view of the helmet 10 is shown. The leading portion 26 is located at the top of the rider's head. Also, the left and right sides of the helmet 10 are symmetrical about medial axis 32. The helmet 10 additionally has a strap 54 for retaining the helmet 10 on the rider's head in the event of a crash. The strap 54 extends downward from the left and right sides of the helmet 10 and is attached to each other by the clip 56 below the rider's chin. The helmet 10 may also be symmetrical about axis 32 when viewed from the front (see FIG. 4) or side (see FIG. 3). In this manner, the wind 15 may be separated by the parabolic leading portion 26 of the exterior shell 14 of the helmet 10 front-to-back and side-to-side.

Figure 5:
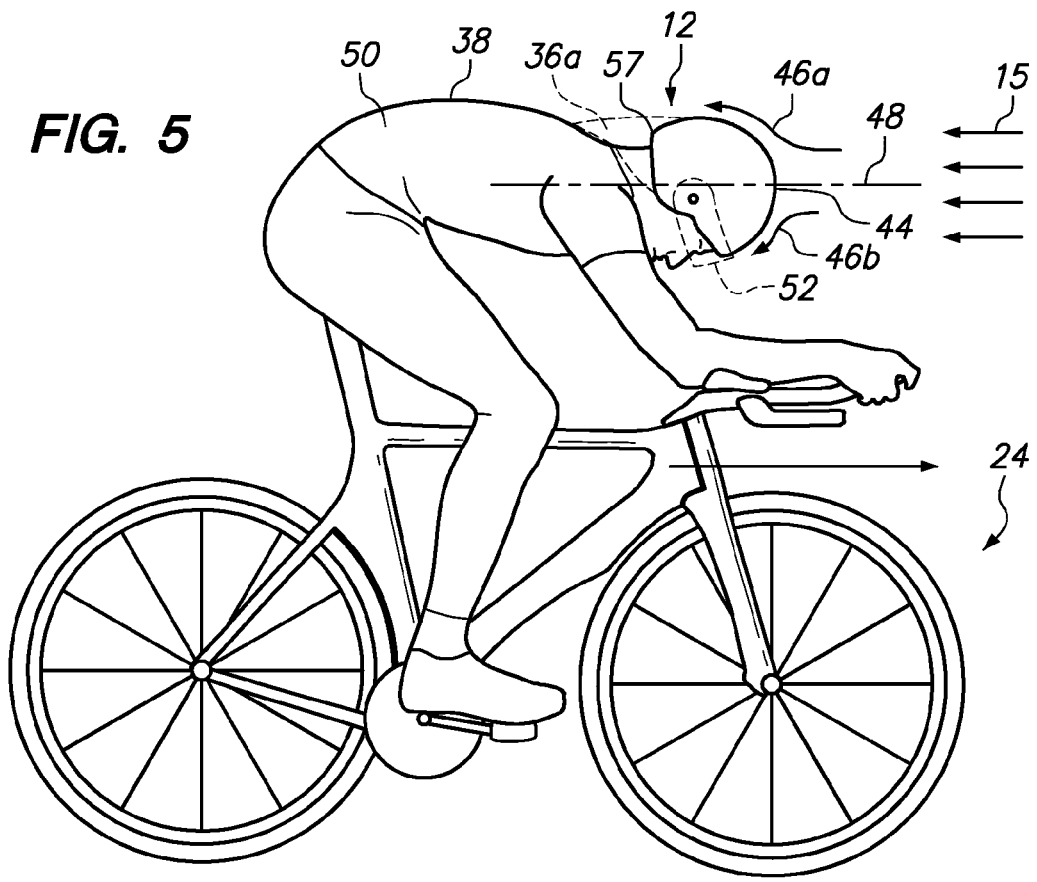
FIG. 5 is a side view of a second embodiment of a spherical shaped helmet.
Figure 6:
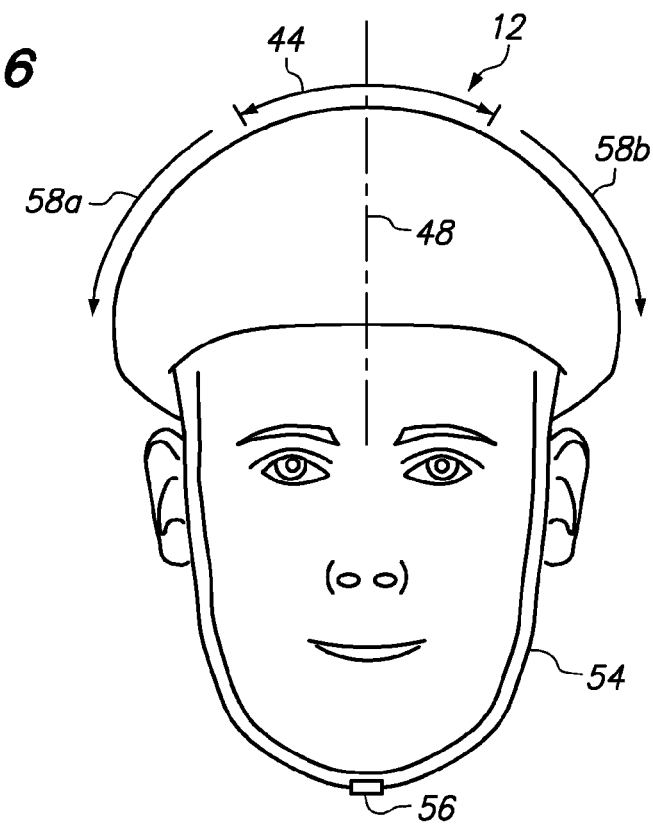
FIG. 6 is a front view of the helmet shown in FIG. 5.

Referring now to FIGS. 5 and 6, a second embodiment of the helmet 12 is shown. Instead of a parabolic leading portion, the leading portion 44 has a spherical configuration. The wind 15 contacts the leading portion 44 and is split up by the spherical leading portion 44. When the rider 50 is in the aggressive position shown in FIG. 5, and the rider's head is looking downward, the oncoming wind 15 initially contacts the spherical leading portion 44. The oncoming wind 15 is diverted above and below the helmet 12 as shown by directional arrow 46a, b. The helmet 12 does not have a rear tail portion 36 that blends with the rider's back surface 38. Rather, the trailing surface 57 follows the contour of the rider's head. This minimizes any low pressure behind the helmet 12 caused by the oncoming wind 15. The oncoming wind 15 flowing in the direction of arrow 46a traverses over the helmet 12 and over the back surface 38 of the rider 50. The oncoming wind 15 also flows under the helmet 12 and under the face mask shown by directional arrow 46b.

Referring now to FIG. 6, the spherical leading portion 44 is also generally located at the top of the rider's head. The wind 15 when the rider 50 is in the aggressive position with his/her head in the down position contacts the spherical leading portion 44 and splits to the left and right sides of the helmet 12 as shown by arrows 58a, b. Preferably, the left or right sides of the helmet 12 are symmetrical about medial axis 48. Additionally, the helmet 12 may also be symmetrical about the medial axis 48 so that the wind is split above and below the helmet 12. The helmet 12 may also be retained on the rider's head by way of straps 54 and clip 56, as discussed above.

Referring now to FIG. 7, the bicycle handlebar video system 20 is shown. The screen 16 is shown as being integrated into the handlebar 22. However, it is also contemplated that the screen 16 may be mounted to the handlebar 22 by way of a flexible shaft 58 as shown in FIG. 8. The rider can adjust the position of the screen 16 so that the screen 16 is in the rider's line of sight when the rider's head is in the downward position. The camera 18 is also shown being in a fixed position on the handlebar 22. However, it is also contemplated that the camera 18 may be mounted so as to be adjustable as shown in FIG. 9. The rider can adjust the direction of the camera's line of sight as needed. The bicycle handle bar video system 20 enables the rider to maintain his/her head in the downward position as shown in FIGS. 3 and 5 while riding the road bicycle 24. These and other aspects of the bicycle handlebar video system 20 are discussed in U.S. patent application Ser. No. 12/257,124, filed on Oct. 23, 2008, the entire contents of which is expressly incorporated herein by reference.

The helmets 10, 12 discussed herein may have an exterior shell, a padding disposed under the exterior shell, straps 54 and clips 56 attached to the padding or exterior shell to retain the helmets 10, 12 on the rider's head in event of a crash, and a face mask 52. The face mask 52 may be transparent and may also be pivoted up so that the rider's eyes are exposed to the environment. Additionally, the face mask 52 may be pivoted down so that the wind 15 does not blow air on the rider's eyes. In this manner, the rider's eyes do not become dry which may be a problem when the rider 50 is wearing contact lenses. Additionally, the face mask 52 extends the potential laminar air flow below the helmet 10, 12 during use. The exterior shell of the helmet 10, 12 may be fluid and have no apertures for providing cooling features to the helmet 10, 12.

Referring back to FIG. 3, the parabolic shaped helmet 10 may also be modified so as to have a trailing surface 57a instead of a trailing portion 36. The trailing surface 57a may behave in the same manner as that described in relation to FIGS. 5 and 6. Moreover, referring back to FIG. 5, the spherical shaped helmet 12 may have a trailing portion 36a instead of a trailing surface 57. The trailing portion 36a may behave in the same manner as that described in relation to FIGS. 3 and 4.

The above description is given by way of example, and not limitation. Given the above disclosure, one skilled in the art could devise variations that are within the scope and spirit of the invention disclosed herein, including various ways of constructing the strap and clip. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An aerodynamic bicycle helmet for decreasing coefficient of drag when a head of a rider is in a down position, the helmet comprising:
    a cushion with a concave cavity for receiving the head of the rider;
    a strap attached to the cushion for maintaining the cushion on the head of rider in the event of a crash;
    an exterior shell disposed over the cushion, the exterior shell having a leading portion and a tail portion, the leading portion having a parabolic configuration, the parabolic leading portion positioned on a top portion of the head of the rider when the helmet is worn by the rider, the tail portion being aerodynamically blended to a back surface of the rider when the head of the rider is in the down position for decreasing the coefficient of drag when the rider's head is in the down position.

2. The helmet of claim 1 further comprising an eye shield attached to the exterior shell for blocking wind to the eyes of the rider.

3. The helmet of claim 1 wherein the exterior shell is continuous and smooth.

4. The helmet of claim 1 wherein the parabolic leading portion is symmetrical about a medial axis which is generally aligned to a spine of the rider when the helmet is worn by the rider.

5. The helmet of claim 1 wherein a trailing surface of the external shell follows a contour of the rider's head.

6. An aerodynamic bicycle helmet for decreasing coefficient of drag when a head of a rider is in a down position, the helmet comprising:
    a cushion with a concave cavity for receiving the head of the rider;
    a strap attached to the cushion for maintaining the cushion on the head of rider in the event of a crash;
    an exterior shell disposed over the cushion, the exterior shell having a leading portion and a trailing surface, the leading portion having a spherical configuration, the spherical leading portion positioned on a top portion of the head of the rider when the helmet is worn by the rider, the trailing surface of the external shell following a contour of the rider's head for decreasing the coefficient of drag when the rider's head is in the down position.

7. The helmet of claim 6 further comprising an eye shield attached to the exterior shell for blocking wind to the eyes of the rider.

8. The helmet of claim 6 wherein the exterior shell is continuous and smooth.

9. The helmet of claim 6 wherein the spherical leading portion is symmetrical about a medial axis which is generally aligned to a spine of the rider when the helmet is worn by the rider.

10. The helmet of claim 6 wherein a tail portion of the external shell is aerodynamically blended to a back surface of the rider.

11. A bicycle riding system comprising:

an aerodynamic bicycle helmet for decreasing coefficient of drag when a head of a rider is in a down position, the helmet comprising:
  a cushion with a concave cavity for receiving the head of the rider;
  a strap attached to the cushion for maintaining the cushion on the head of rider in the event of a crash;
  an exterior shell disposed over the cushion, the exterior shell having a leading portion with a spherical or a parabolic configuration, the leading portion positioned on a top portion of the head of the rider when the helmet is worn by the rider, a tail portion or trailing surface of the exterior shell being aerodynamically blended to a back surface of the rider for decreasing the coefficient of drag when the rider's head is in the down position;

a bicycle comprising:
  a front wheel;
  a rear wheel;
  a frame with the front and rear wheels attached to the frame;
  a steering system attached to the front wheel and the frame for steering the front wheel;
  a video system attached to the steering system with a camera positioned to provide a front view of the bicycle path in front of the front wheel of the bicycle and a video screen positioned upward so that the rider can view the video displayed on the video screen while the rider's head is in the down position to provide the front view of the bicycle path.

* * * * *